(12) United States Patent
Bortz et al.

(10) Patent No.: US 8,320,556 B1
(45) Date of Patent: Nov. 27, 2012

(54) METHOD TO ALLOW CRYPTOGRAPHIC PROCESSING OF MESSAGES WITHOUT SANITIZING THE CRYPTOGRAPHIC PROCESSOR BETWEEN MESSAGES

(75) Inventors: Mark A. Bortz, Robins, IA (US); David W. Jensen, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1565 days.

(21) Appl. No.: 11/541,460

(22) Filed: Sep. 28, 2006

(51) Int. Cl.
  *G06F 21/00* (2006.01)
(52) U.S. Cl. ............... 380/25; 380/2; 380/52; 380/277; 380/278; 380/287
(58) Field of Classification Search ............... 380/2, 52, 380/277, 278, 287; 713/150, 153, 189, 193, 713/200, 201; 726/12
  See application file for complete search history.

(56) References Cited

U.S. PATENT DOCUMENTS 5,631,960 A * 5/1997 Likens et al. ............... 380/2
6,101,255 A * 8/2000 Harrison et al. ............ 380/52

\* cited by examiner

*Primary Examiner* — Jeffrey Pwu
*Assistant Examiner* — Helai Salehi
(74) *Attorney, Agent, or Firm* — Donna P. Suchy; Daniel M. Barbieri

(57) ABSTRACT

An improved architecture is disclosed of a crypto engine, such as a Janus Crypto Engine (JCE) having a Programmable Cryptographic Channel (PCC) using a Programmable Cryptographic Processor (PCP). The architecture of the crypto engine does not require zeroizing between messages received by the PCC. Consequently, using the new architecture of the present invention, the crypto engine can allocate PCC resources based on throughput and algorithm needs, reducing latency, and employing fewer PCCs.

15 Claims, 4 Drawing Sheets

METHOD TO ALLOW CRYPTOGRAPHIC PROCESSING OF MESSAGES WITHOUT SANITIZING THE CRYPTOGRAPHIC PROCESSOR BETWEEN MESSAGES

BACKGROUND OF THE INVENTION

1. Field of Invention

The present invention relates generally to cryptographic processing of messages and more particularly to an improved architecture for cryptographic engines.

2. Description of Related Art

Assets are often protected or controlled to prevent loss of classified information, particularly if the implementation of the asset can be determined by reverse engineering. A means for protecting assets, often communication and data assets, is through the use of cryptography. Cryptography may refer to the encryption of information or data into an unreadable format. Only those with a key associated with the method of encryption may decipher the information or data.

Those assets which employ cryptography may be classified as Controlled Cryptographic Items (CCI) and are subject to special handling and protection policies. It would be relatively infeasible to provide such protection of a cryptographic system in a commercial application. A solution to this issue is the use of a non-Controlled Cryptographic Item (CCI) cryptographic engine, also known as a crypto engine. One example of a cryptographic engine is the Rockwell Collins JANUS Crypto Engine. A crypto engine may have implementation parameters loaded in volatile memory upon startup of the system and are completely erased upon removal of power.

A crypto engine may include several PCCs. Each PCC may include a Programmable Cryptographic Processor (PCP), as explained further herein and microcode that implements the crypto algorithm. In a conventional application of a crypto engine, a PCC must be zeroized (sanitized) between different messages passed through each PCC. Zeroization for a register may refer to a reset of the register. Zeroization for memory is more complicated; it involves writing zero's then one's to each location, and this cycle is typically repeated three times. A problem associated with sanitization of the PCC between different messages is the latency issues derived from such a process. As a result, a crypto engine must contain additional PCCs to process messages in an efficient manner. The additional PCCs are not necessarily required because of throughput requirements but because of the latency issues of setting up a PCC to process the new message—the latency caused by zeroizing between messages. If a single PCC could be trusted to not contaminate a message with previous data in the PCC, then this single PCC could process messages without zeroizing the PCC between each message. This would remove a significant amount of overhead and potentially allow the crypto engine to contain fewer PCCs. The overhead of zeroizing the PCC also arises when messages have differing classification levels.

Consequently, what is lacking in the prior art is a superior way of handling multiple messages within a single crypto engine so that costly latency via zeroizing of the PCC is eliminated.

SUMMARY OF THE INVENTION

In the present invention, an architecture for a crypto engine is developed to handle multiple messages without fear of contamination between the messages, and without having to zeroise the programmable cryptographic channel (PCC) in a crypto engine.

A methodology is disclosed for designing such a PCC. A formal model of the specification regarding the operation of the algorithm in the PCC may be generated. In order to prove that the PCC can be trusted not to contaminate a message with previous data, a formal model of the hardware is developed. Then formal descriptions of the software executing on the PCC can be developed. The software descriptions and formal model of the hardware may be analyzed against the formal model of the specification. The application of formal methods to both the hardware and software of the PCC validates that a given PCC configuration could be trusted. In such a fashion, properties of the crypto engine and programmable cryptographic channel may be proved. For example, a property of the PCC configuration of the present invention may be that data may only be read upon writing of the data. This may ensure that "old data" is not read and may prevent the requirement of zeroization of data between messages through the programmable cryptographic channel.

Another feature of the present invention is to use fewer PCCs within a crypto engine. Any one of several types of crypto processors, including a general purpose computing processor, digital signal processor (DSP), or cryptographic processor, customized ASIC or FPGA, and any necessary memory, may be employed. Using the new architecture of the present invention, the crypto engine of the present invention may allocate at least one PCC based on throughput and algorithm needs, and fewer PCCs need be employed over prior techniques and architectures.

The sum total of all of the above advantages, as well as the numerous other advantages disclosed and inherent from the invention described herein, creates an improvement over prior techniques.

The above described and many other features and attendant advantages of the present invention will become apparent from a consideration of the following detailed description when considered in conjunction with the accompanying drawings.

BRIEF DESCRIPTION OF THE DRAWINGS

Detailed description of preferred embodiments of the invention will be made with reference to the accompanying drawings. Disclosed herein is a detailed description of the best presently known mode of carrying out the invention. This description is not to be taken in a limiting sense, but is made merely for the purpose of illustrating the general principles of the invention. The section titles and overall organization of the present detailed description are for the purpose of convenience only and are not intended to limit the present invention.

Figure 1A:
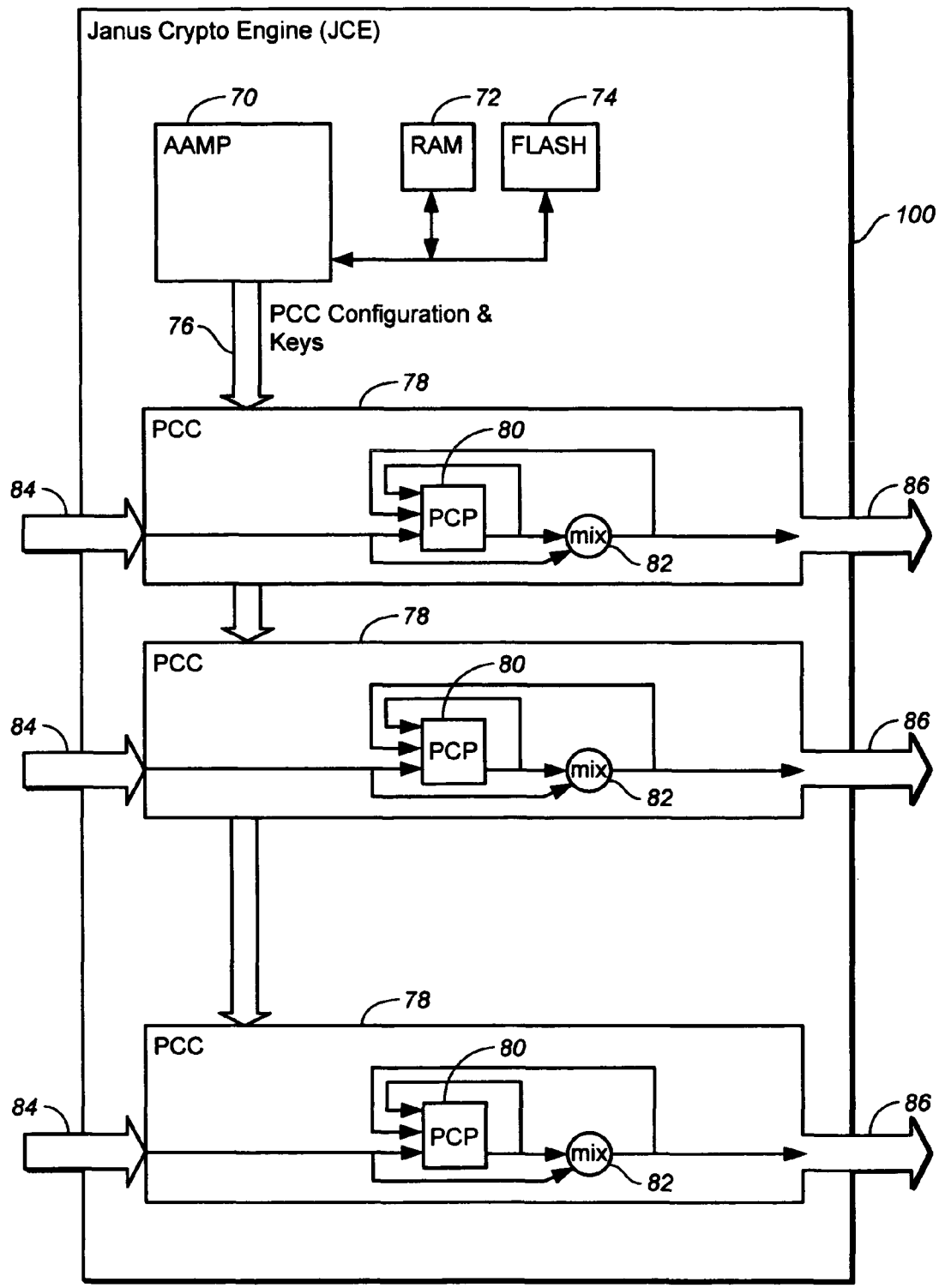
FIG. 1A is a diagram showing the architecture of a crypto engine in accordance with an embodiment of the present invention.

It should be understood that one skilled in the art may, using the teachings of the present invention, vary embodiments shown in the drawings without departing from the spirit of the invention herein. In the figures, elements with like numbered reference numbers in different figures indicate the presence of previously defined identical elements.

DETAILED DESCRIPTION OF THE INVENTION

The present invention may be implemented in either software or hardware, and the hardware may be programmed to perform the functions outlined herein (e.g., an ASIC). The hardware may run software or firmware, e.g. microcode, with the software existing in memory, which comprises the programmable portion of the hardware.

In the present invention, as shown most clearly in FIG. 1A, crypto engine (100), has multiple Programmable Cryptographic Channels (PCCs) (78), which are a combination of a hardware portion, the Programmable Cryptographic Processor (PCP)(80) and a software portion (i.e. the programmable microcode that implements any algorithm in the PCC or PCP. Crypto engine 100 may be a JANUS Crypto Engine manufactured by Rockwell Collins. Cryptographic processing is performed by the PCP. The crypto engine may include a general purpose processor, such as the Rockwell Collins Advanced Architecture MicroProcessor (AAMP)(70), but in general can be any kind of processor, including but not limited to an ARM processor, an XScale processor, or a DSP and the like. Input (84) and output (86) represent data carried by the PCC (78) to and from the crypto engine (100). Ram (72) and flash (74) memory supply the AAMP processor which controls the PCC configuration and cryptographic keys (76), shown by the vertically extending arrows leading from the AAMP to each of the PCCs (78). Data may be mixed (e.g., XOR'ed) between data sources, as shown conceptually by the circular 'mix' symbol (82). Though the crypto engine of FIG. 1A is one preferred embodiment for carrying out the invention, in general the invention can apply to any system performing encryption, and is not limited to the FIG. 1A system.

Each PCC is generally associated with a particular encryption algorithm. Thus the PCC is a combination of a hardware portion comprising the PCP (Programmable Cryptographic Processor) and a software portion in the form of microcode (the coded instructions in firmware that are stored permanently in read-only memory) that implements algorithms. Though firmware is preferred for the software portion of the invention to store microcode, or more generally program code (instructions, including machine language instructions) for the PCC, it should be understood that the software portion that includes program code could be adapted to be stored in volatile memory and not just non-volatile memory. Non-volatile memories for read-only firmware could include EPROMs, EEPROMs, flash memory MRAM, FeRAM and solid state disk, as well as other equivalents.

In an advantageous aspect of the present invention, the PCC is configured so that it need not be zeroized when changing between message threads passed through the crypto engine. Message threads, typically digital data packets containing one or several words, could come from different users or applications, and may have different security classifications and encryption algorithms associated with them.

In a prior implementation (assigned to the present assignee) of the crypto engine, all storage elements in the PCP and the PCC of the crypto engine had to be zeroized between messages passed through the crypto engine. This typically meant that the crypto engine had to contain additional PCCs to process messages quickly. The additional PCCs may not be required because of throughput requirements but because of the latency issues of setting up a PCC to process the new message. If a single PCC could be trusted to not contaminate a message with previous data in the PCC, then this single PCC could process messages without zeroizing the PCC between each message. Removing zeroizing between messages would remove a significant amount of overhead and potentially allow the crypto engine to contain fewer PCCs. The overhead of zeroizing the PCC also arises when messages have differing classification levels. Stated positively, the limitation of the PCC in processing message threads without zeroizing between messages can be termed processing messages with non-zeroization between messages.

Figure 1B:
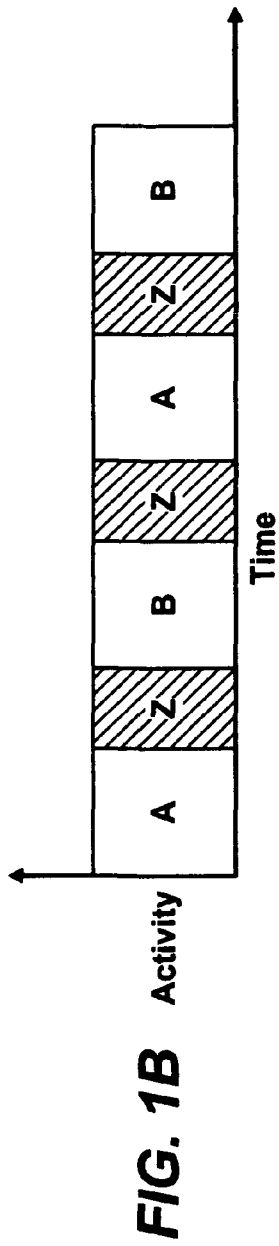
FIG. 1B shows a conceptual timing diagram of how a prior method handled data streams.

FIG. 1B shows a conceptual timing diagram of how the prior method, which the present invention improves upon, handled data streams. The timeline shows an output stream of data in message threads comprising blocks, typically digital data, over the time domain, labeled A and B, which may be digital words that a microprocessor data register would hold, and that are generated from a programmable cryptography channel that is not using formally proven separation of data streams. Consequently, as explained, zeroization is necessary between different message threads, as indicated by the cross-hatched shaded block of time labeled Z, which form a guard band in the time domain where no data may be transferred, and consequently algorithm throughput in the cryptographic processor is dramatically reduced.

Figure 1C:
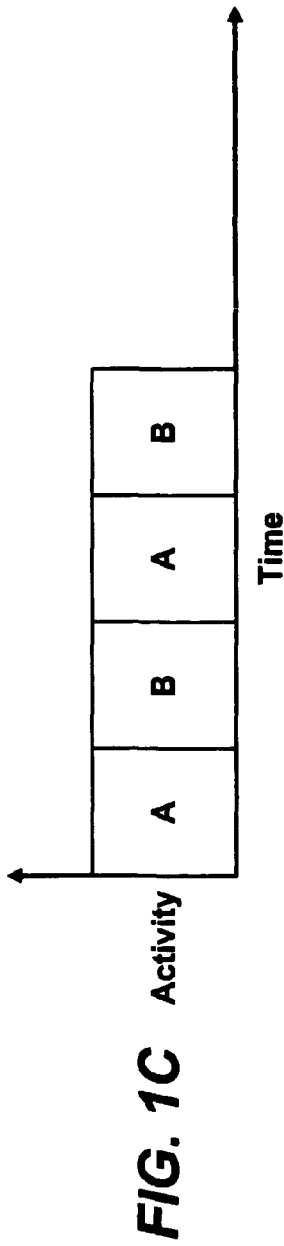
FIG. 1C shows a conceptual timing diagram of how the present invention handles data streams.

By contrast, FIG. 1C shows a conceptual timing diagram of how the present invention handles data streams. The timeline in FIG. 1C shows the same output stream generated from a programmable cryptography channel that uses the formally proven separation of data streams in message threads as taught by the present invention. Zeroization is unnecessary, by definition, between the message threads in the cryptographic processor, such as the message threads labeled A and B, and no lost gap in time is necessary, so there is no time lost for zeroization and no guard band Z; consequently, the algorithm throughput in the cryptographic channel is dramatically increased.

Figure 1D:
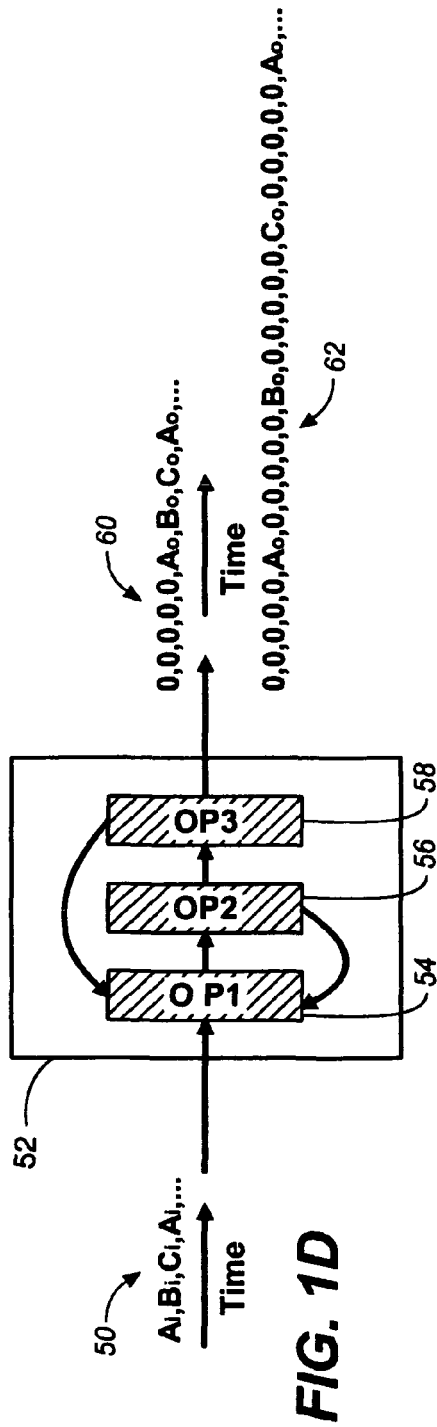
FIG. 1D is a conceptual diagram of a cryptographic channel pipeline according to the present invention compared to prior methods.

FIG. 1D is a conceptual diagram of a processor pipeline according to the present invention compared to prior methods. A stream of message threads 50, comprised of words $A_i$, $B_i$, $C_i$ ... over time, feed into a Programmable Cryptographic Processor (PCP) and Programmable Cryptographic Channel (PCC), as presented for example by the present assignee's Janus Crypto Engine (JCE), all represented by block 52. The combined input from these three streams of data words 50 go into the programmable cryptographic channel and feed into logic in the PCP, as indicated by OP blocks OP1, OP2, OP3, labeled 54, 56, 58 respectively. The OPs represent functions or a series of operations in the PCC with multiple data paths and the flow of the data through the PCC (which is as shown in FIG. 1A) and the functions selected with microcode. Encryption is performed by passing data through the appropriate OP blocks, which may pass data back and forth amongst each other as shown by the arrows in FIG. 1D.

The output of block 52 shows the effect of the present invention compared to prior techniques. The upper data sequence output over time, labeled 60 in FIG. 1D, shows what the output looks like in the present invention when employing the crypto engine and any similar cryptographic channel and processor. The lower data sequence, labeled 62, shows what the output looks like in prior techniques that employ zeroization in the crypto engine. The present invention provides for greater throughput caused by decreased latency that comes from no zeroization between message streams $A_i$, $B_i$, $C_i$, and the like. Thus in data output 60, zeroization is unnecessary and algorithm latencies can be hidden by programming that interleaves operations, with no need for a zeroization guard band (indicated by the character "0" in the data sequence 60). Throughput is consequently increased. The processing of message streams, such as data words Ai, Bi, Ci, and the like between different sources can be as short as a single clock cycle.

By contrast, in prior methods, the output stream was generated without formally proven separation of data streams, which necessitated (to prevent contamination of data), zeroization, as indicated by the characters "0" interspersed between the message stream data words $A_0$, $B_0$ $C_0$ and the like. As can be seen, there are more "zero" guard band and lost time in output data sequence 62, the prior method, than output data sequence 60, the present invention. Consequently, with zeroization, the algorithm latencies dramatically reduce throughput in prior methods involving the crypto engine and any similar cryptographic channel and processor.

Figure 2A:
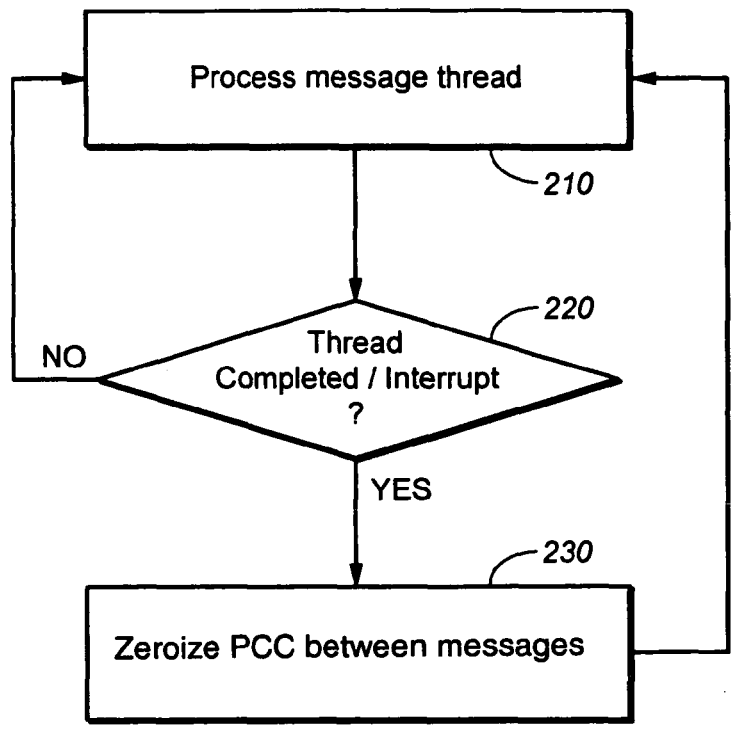
FIG. 2A shows a flowchart for handling messages in a crypto engine according to prior techniques that the present invention improves upon.
Figure 2B:
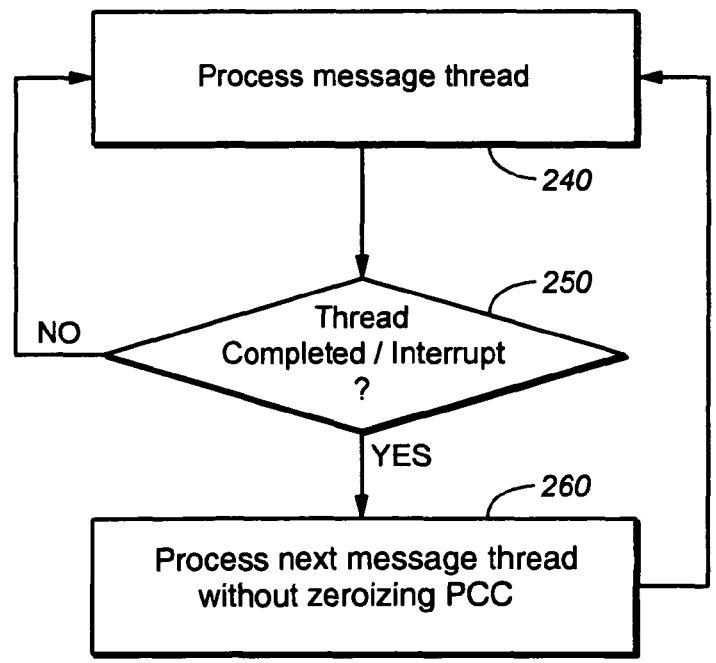
FIG. 2B shows a flowchart for handling messages in a crypto engine according to the present invention.

Turning attention to FIG. 2 (FIGS. 2(*a*), 2(*b*)), there are shown flowcharts of the invention as compared to prior techniques. In FIG. 2 (*a*), the process for the prior technique, which the present invention improves upon, is described in a high-level flowchart. At step 210, labeled "Process Message Thread", a message thread, generally comprised of digital data in a pulse train, is processed by a core of a processor such as processor PCP as shown in FIG. 1A. If the message thread is not completed or no interrupt occurs that warrants switching to another thread to be processed, the process continues to loop, as shown in decision box 220, labeled "Thread Completed/Interrupt?", otherwise, the Programmable Cryptographic Channel (PCC) is zeroized between the present thread and the next thread to be processed, as indicated in step 230, labeled "Zero PCC between Messages", and the process repeats. The zeroizing of the PCC to flush out data relating to a previous thread, to sanitize the cryptographic processor between messages and prevent contamination with the next thread to be processed, may take several clock cycles.

By contrast, the flowchart of the present invention is shown in FIG. 2(*b*). As in the prior efforts, a processor, such as PCP processor working in the PCC, processes data in a message thread, which may be digital data in a packet format. The data may be from multiple message threads where the data therein is associated with a unique algorithm relating to an encryption algorithm standard by suitable encryption means, typically a crypto processor, including but not limited to encryption via encryption algorithms such as AES, RSA, DES, Triple DES, El Gamal, and the like. The present invention is applicable to single algorithm and multiple algorithms.

At step 240, labeled "Process Message Thread", a message thread, generally comprised of digital data in a pulse train, is processed by a core of a processor, such as processor PCP in FIG. 1A, in a PCC. If the message thread is not completed or no interrupt occurs that warrants switching to another thread to be processed, the process continues to loop, as shown in decision box 250, labeled "Thread Completed/Interrupt?". If the thread is completed or an interrupt is received by the processor that warrants switching to another message, the processor can switch to this other message thread without having to zeroize the PCC, as indicated in step 260, labeled "Process Next Message Thread without Zeroizing PCC", and the process repeats seamlessly. Switching to another thread can occur in as little as one clock cycle, and in any event in fewer clock cycles than the prior techniques.

Figure 3:
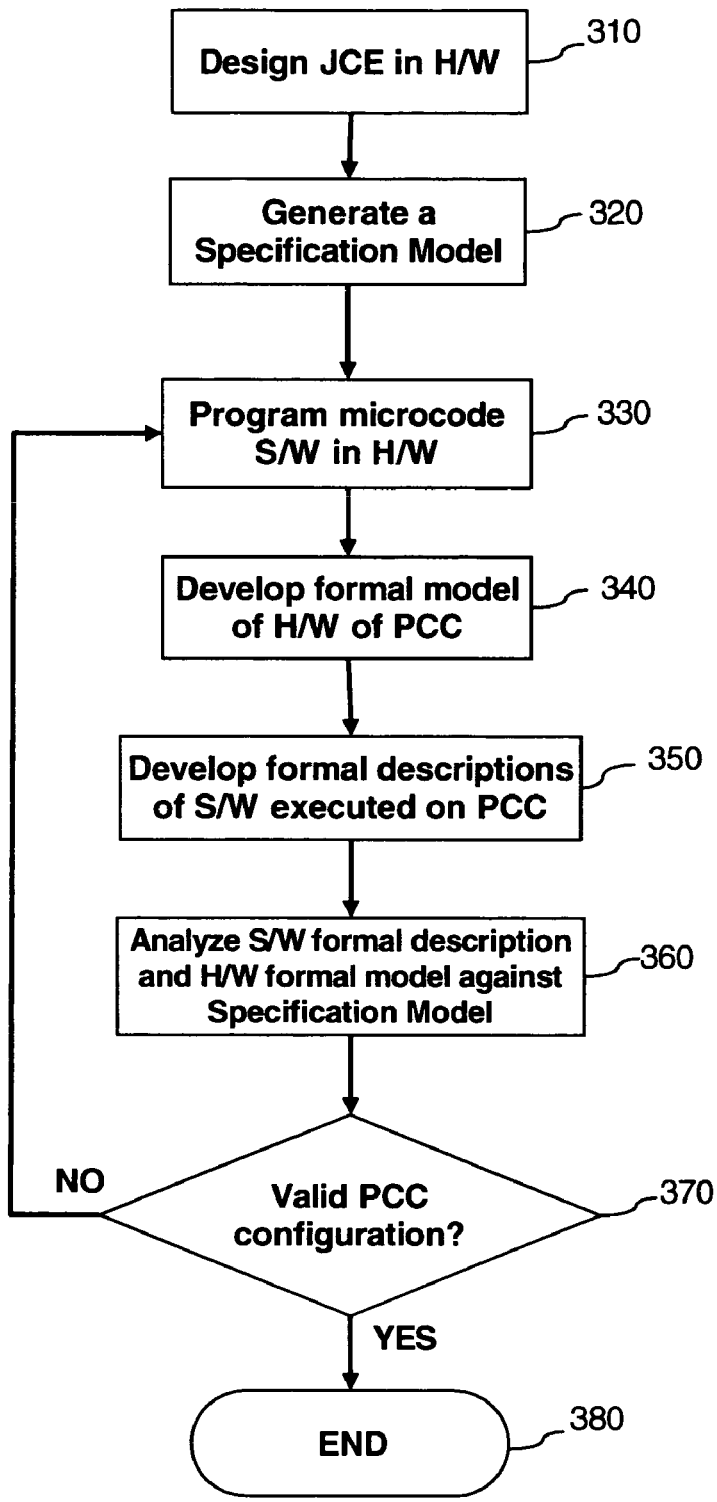
FIG. 3 shows a methodology for building a crypto engine according to the teachings of the present invention.

Turning attention now to FIG. 3, the present invention further employs a methodology for designing the crypto engine to achieve the present invention. In order to prove that the Programmable Cryptographic Channel (PCC) of the crypto engine can be trusted not to contaminate a message with previous data, a formal model of the specification that can be reasoned against is developed. Then formal descriptions of the hardware and the software executing on the PCC can be developed, analyzed and reasoned against this formal model of the specification. The application of formal methods to both the hardware and software of the PCC validates that a given PCC configuration could be trusted.

Formal methods may refer to mathematically based techniques for the specification, design and verification of software and hardware systems. Formal methods may be employed to develop a specification, for example, a description of the hardware and software of the PCC. The description may include well-formed statements in mathematical logic whereby the design and verification provide that the well-formed statements are proved. As such the specification may be utilized as a basis for proving properties of the specification and the developed software and hardware of the PCC. In one embodiment of the invention, a property associated with the crypto engine and PCC may be that data may only be read upon writing of the data. This may ensure that "old data" is not read and may prevent the requirement of zeroization of data between messages through the programmable cryptographic channel.

After validating the trust of a PCC configuration, the requirement to zeroize the PCC between messages even if the messages were of differing classifications is removed. This trust would allow the crypto engine to only allocate PCCs based on throughput and algorithm needs and should allow the crypto engine to contain fewer PCCs.

Thus, as shown in FIG. 3, step 310 labeled "Design JCE in H/W" the hardware associated with the JCE, or crypto engine, of the present invention is designed. This includes all the standard techniques of hardware design, including building of ASICs (Application Specific ICs) and/or FPDs (Field Programmable Devices), including logic synthesis, placement/routing and timing closure. Often the hardware is designed using a hardware description language (HDL) and netlists, and then reduced to a functioning physical presence on a piece of silicon. What is left after this step is a crypto engine that has software programmable elements in it, such as microcode in the crypto engine and PCC, the microcode (instructions) are loaded in volatile memory upon startup of the system. Microcode is a permanent memory that holds the elementary circuit operations a computer processor must perform for each instruction in its instruction set; it is also the firmware coded instructions that are stored permanently in read-only memory. Microcode acts as a translation layer between the instruction and the electronic level of the computer and enables the computer architect to more easily add new types of machine instructions without having to design electronic circuits.

In step 320, labeled "Generate Model of Specification", a formal model of the specification regarding the operation of the algorithm in the PCC may be generated. In step 330, labeled "Program Microcode S/W in H/W", the microcode is modified so that no zeroizing of the hardware is necessary, as taught herein. Rules may be introduced, as should be apparent to one of ordinary skill in the art from the teachings herein, to achieve this effect. A key property is that internal initialized property is proven with write before read, thus hardware is written to before being read, to prevent contamination. Other such rules may be developed, as should be apparent to one of ordinary skill in the art from the teachings herein.

Because of the time and expense in constructing hardware, it is preferable that any modifications to hardware be done though software, such as changing the microcode on the microprocessor of the PCC or the PCC itself. Thus, in step 330, labeled "Program Microcode S/W in H/W", the microcode for the H/W that will enable no zeroization between message threads handled by the PCC is written for the hardware. Thus, the optimal way of modifying the PCC of the crypto engine is though software modifications, though as a second-best way the crypto engine could be modified in hardware as well.

In step 340, labeled "Develop Formal Method of H/W of PCC" a formalized model of the PCC is constructed. A formalized model may be constructed with suitable software tools, including formal verification software, which are software tools to convert hardware descriptions of a circuit into a mathematical model. Thus different netlists can be compared and analyzed mathematically. Formal verification can also be employed on software portions of a processor, such as the microcode.

Thus in step 340, labeled "Develop Formal Model of H/W of PCC", the PCC hardware is developed into a formal model, that can be compared and analyzed mathematically, for the operation of the hardware running the PCC.

Regarding the software portion of the present invention, in step 350, labeled "Develop Formal Descriptions of SAN executed on PCC", a formal analysis of the software executed on the PCC is developed, and the operation of the PCC under this software.

In step 360, labeled "Analyze SAN Formal Model Description and H/W Formal Model against Specification Model" the formal descriptions of the software executed on the PCC that have been developed in the previous step, step 350, and the hardware model developed in step 340 may be analyzed against the specification model developed in step 320. The software/specification of the PCC is matched model to model, preferably manually, with human input, but potentially the present invention teaches that such step may in the future be automated by computer aided design and computer aided decision making rules.

In decision block step 370, labeled "Valid PCC configuration", the formal methods confirm that a given PCC configuration could be trusted not to contaminate message threads and compromise security despite not zeroizing the PCC. If such a confirmation is present, the method ends, as indicated by step 380 labeled "End", otherwise, the flow is returned to step 330 labeled "Program Microcode S/W in H/W", and the process repeats by preferably modifying the microcode, as in step 330.

The application of the present invention to avoid the need to zeroize the PCC between messages, even if the messages were of different classifications, would allow the crypto engine to only allocate PCCs based on throughput and algorithm needs. Consequently, application of the present invention should allow the crypto engine to contain fewer PCCs, compared to prior techniques, however, the number of PCCs is generally speaking not relevant, what is important is that latency is decreased from not having to zeroize.

While the microprocessor of the crypto engine is preferably the Rockwell Collins Advanced Architecture MicroProcessor (AAMP), in general, any other processor, e.g. an ARM processor (e.g., a RISC-based StrongARM or an XScale processor), an ASIC, FPGA, PLD (Programmable Logic Device), DSP, and the like, and any necessary associated memory and I/O means, may be employed by one of ordinary skill in the art using the teachings therein. Though firmware is preferred for the software portion of the invention to store microcode, or more generally program code for the crypto engine and PCC, it should be understood that the software portion that includes program code could be adapted to include volatile memory and not just non-volatile memory.

It is intended that the scope of the present invention extends to all such modifications and/or additions and that the scope of the present invention is limited solely by the claims set forth below.

We claim:

1. An improved architecture for a programmable cryptographic channel system, comprising:
   a programmable cryptographic channel (PCC) comprising a programmable cryptographic processor (PCP) and a memory, holding program code comprising microcode;
   a plurality of message threads comprising data received by the PCP, said message threads each processed by the PCP of said PCC; and
   said PCC is configured so that said PCP switches from processing one message thread to another message thread; and wherein said PCP processes the plurality of message threads with non-zeroisation between message threads while preventing contamination of each of the plurality of message threads with previous data.

2. The invention according to claim 1, wherein: said programmable cryptographic channel and said message threads therein are associated with an encryption algorithm, said encryption algorithm selected from the group of encryption algorithms consisting of AES, RSA, DES, Triple DES or El Gamal.

3. The invention according to claim 1, further comprising: a plurality of said programmable cryptographic channels (PCCs), each of the plurality of said PCCs including a PCP and a memory, each of the plurality of said PCCs containing at least one message thread.

4. The invention according to claim 1, wherein the plurality of message threads includes at least two security classifications.

5. The invention according to claim 2, further comprising:
   volatile memory operatively connected to said PCC;
   said program code comprising microcode is firmware comprising microcode; and said programmable cryptographic processor is a processor loaded by parameters from said microcode upon startup of said PCC.

6. The invention according to claim 3 wherein: each of said programmable cryptographic channels hold a particular encryption algorithm unique from the encryption algorithms in said other channels; said encryption algorithm selected from the group of encryption algorithms consisting of AES, RSA, DES, Triple DES or El Gamal.

7. The invention according to claim 3, wherein: each of said PCCs hold a plurality of message threads associated with said PCCs, and the output of said plurality of PCCs interleaves the data from said message threads; and said programmable cryptographic channels and said message threads therein are associated with an encryption algorithm, said encryption algorithm selected from the group of encryption algorithms consisting of AES, RSA, DES, Triple DES or El Gamal.

8. The invention according to claim 5, further comprising:
   a general purpose processor operatively connected to said PCC and controlling the configuration of said PCC and said encryption algorithm, and said microcode controls said PCC and said PCP.

9. The invention according to claim 6, further comprising:
   volatile memory operatively connected to said PCC; said program code comprising microcode is firmware comprising microcode, and said PCP having implementation parameters loaded in said volatile memory upon startup of said PCC.

10. A method of allowing cryptographic processing of messages without sanitizing the cryptographic processor between messages comprising the steps of:

programming a programmable cryptographic channel (PCC) comprising a cryptographic processor, and programming said PCC with a memory holding program code for programming said PCC;

providing said PCC with a plurality of message threads comprising data, said message threads each processed by the processor associated with said PCC;

configuring said PCC so that said PCC processor switches from processing a first message thread of the plurality of message threads to a second another message thread of the plurality of message threads while preventing contamination of the second message thread from the first message thread, without zeroizing the PCC between each message thread.

11. The method according to claim 10, further comprising the steps of: encrypting said message threads in said programmable cryptographic channel with an encryption algorithm, said encryption algorithm selected from the group of encryption algorithms consisting of AES, RSA, DES, Triple DES or El Gamal; and said processor is an programmable cryptographic processor.

12. The method according to claim 11, further comprising the steps of:

programming the configuration of said PCC using a general purpose processor.

13. The method according to claim 12, further comprising the steps of: providing a plurality of said PCCs, each of the plurality of said PCCs including a cryptographic processor;

transmitting in each of said plurality of PCCs a particular message thread unique from the message threads transmitted in said other PCCs.

14. The method according to claim 13, further comprising the steps of: providing volatile memory; and providing microcode having instructions for said cryptographic processor of said PCC.

15. The method according to claim 14, further comprising the steps of:

loading said programmable cryptographic processor and said PCC with said microcode upon startup of said PCC.

* * * * *